Aug. 2, 1927.  
S. KURZER  
1,637,948  
HOSE SUPPORTER  
Filed Aug. 4. 1926

WITNESSES  
Edw. Thorpe  
A. L. Kitchin

INVENTOR  
Solomon Kurzer  
BY  
ATTORNEYS

Patented Aug. 2, 1927.

1,637,948

UNITED STATES PATENT OFFICE.

SOLOMON KURZER, OF NEW YORK, N. Y.

HOSE SUPPORTER.

Application filed August 4, 1926. Serial No. 127,128.

This invention relates to hose supporters and has for an object to provide an improved construction wherein means are presented which will act to tighten or pinch the top of the hose against the leg and thereby produce a supporting action.

Another object of the invention is to provide a hose supporter wherein means are presented for properly supporting the hose which cannot be readily observed.

A further object, more specifically, is to provide in a hose supporter an elastic member with means for connecting the opposite ends to a hose so that the same will contract the upper end of the hose when in use.

In the accompanying drawing—

Referring to the accompanying drawing by numerals, 1 indicates a stocking or hose and 2 the supporter connected to the upper part of the hose so as to constrict the same and thereby produce a supporting action. The supporter 2 is provided with an elastic member 3 which may be rubber or may be a fabric including rubber so that an elastic structure is presented. Connected with the elastic structure 3 are clips 4 and 5 of identical construction though arranged adjacent each end of member 3. The description of one will, therefore, apply to both.

Figure 4:
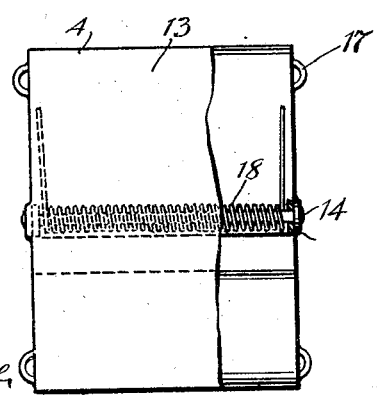
Figure 4 is an enlarged view with certain parts broken away with one of the clips shown in Figure 3.
Figure 5:
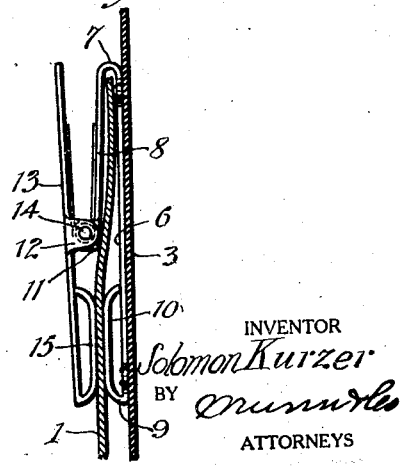
Figure 5 is an enlarged fragmentary sectional view through Figure 1 on line 5—5.

As indicated in Figures 4 and 5, the clip 4 is formed with a plate or body 6 bent at 7 for forming the hinge supporting section 8 and bent at 9 for forming the clamping section 10. The section 8 is provided with a pair of ears 11 co-acting with the ears 12 on the clamping plate 13, which clamping plate is connected to the section 8 by pintle 14 and ears 11 and 12. A suitable spring 18 surrounds pintle 14 and acts on section 8 and on the clamping plate 13 for causing the clamping plate to function. The end of plate 13 is provided with a bent over gripping portion or section 15 co-acting with the section 10 for gripping part of the hose 1. Suitable stitching 16 is provided and is preferably caused to extend through loops 17 on plate 6, said stitching extending also into or through part of the elastic member 3.

Figure 1:
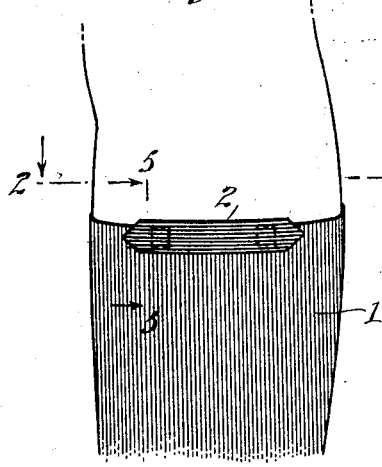
Figure 1 is a side view of part of a hose arranged on a figure with an embodiment of the invention applied thereto.
Figure 2:
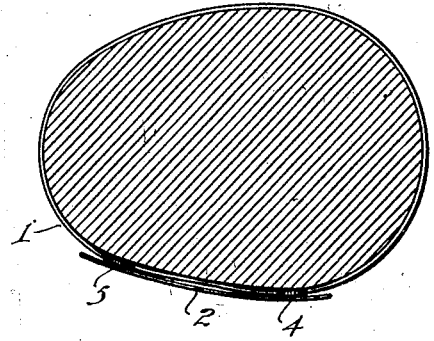
Figure 2 is a sectional view through Figure 1 on line 2—2.
Figure 3:
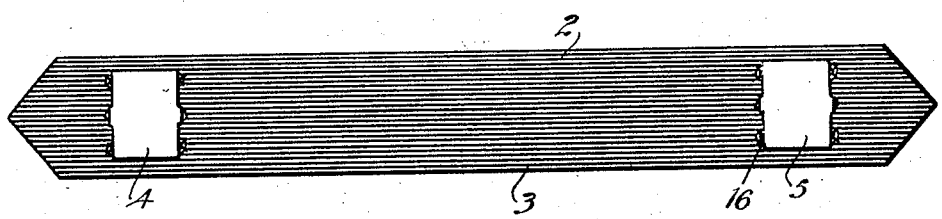
Figure 3 is an enlarged side view of the supporter shown in Figure 1, looking at the same from the opposite side.

When the device is to be used, the parts are arranged as shown in Figure 3 for instance and one clip, as for instance, clip 4, is slipped over the upper edge of the hose and forced downwardly until the upper edge of the hose fits against the bend 7. The elastic member 3 is then stretched to a desired extent and the clip 5 slipped over the upper edge of the hose in a similar manner to clip 4. Upon releasing the member 3 it will immediately contract and thereby constrict the upper edge of the hose 1 so as to produce a supporting action. If the strip 3 is of the same color as the hose 1, the same will not be noticed even if the upper end of the hose 1 is exposed to view.

What I claim is:

1. In a hose supporter, a gripping member including a base plate formed at one end with a turned over flattened section presenting a resilient gripping portion and at the other end with portions bent back on the plate to a point substantially centrally of the plate, a pair of ears extending from said last mentioned portions, a clamping plate formed with a pair of ears positioned to register with the first mentioned ears, and a turned over flattened section co-acting with the turned over flattened section of the base plate, a pintle for connecting said ears together, and a spring for causing said clamping plate to function.

2. In a hose supporter, a gripping member including a base formed at one end with a gripping surface extending longitudinally of the base and the other end with a bent over section extending substantially half way of the base and spaced therefrom, a clamping plate hingedly connected at its center to the end of said bent over section, said clamping plate having an elongated gripping section registering with the gripping surface of said base, and a spring acting against said clamping plate and said bent over section.

SOLOMON KURZER.